(12) United States Patent
Kim et al.

(10) Patent No.: US 9,869,892 B2
(45) Date of Patent: Jan. 16, 2018

(54) DISPLAY APPARATUS AND METHOD OF MANUFACTURING THE SAME

(71) Applicant: Samsung Display Co., Ltd., Yongin, Gyeonggi-do (KR)

(72) Inventors: Joo-Suc Kim, Busan (KR); Min-Gwan Hyun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 572 days.

(21) Appl. No.: 14/509,130

(22) Filed: Oct. 8, 2014

(65) Prior Publication Data

US 2015/0131023 A1 May 14, 2015

(30) Foreign Application Priority Data

Nov. 11, 2013 (KR) .......................... 10-2013-0136580

(51) Int. Cl.
*G02F 1/1333* (2006.01)

(52) U.S. Cl.
CPC ................. *G02F 1/133308* (2013.01); *G02F 2001/133317* (2013.01); *G02F 2001/133322* (2013.01); *G02F 2001/133354* (2013.01)

(58) Field of Classification Search
CPC ......... G02F 1/133308; G02F 1/133608; G02F 2001/133322; G02F 2001/133354; G02F 2001/133317
USPC .......................................................... 349/58
See application file for complete search history.

(56) References Cited

U.S. PATENT DOCUMENTS

| | | | |
|---|---|---|---|
| 7,236,624 B2 | 6/2007 | Ohazama | |
| 7,551,451 B2 | 6/2009 | Kim et al. | |
| 7,626,676 B2 * | 12/2009 | Jo | G02F 1/1333 349/158 |
| 2012/0162211 A1 | 6/2012 | Choi et al. | |
| 2012/0176814 A1 * | 7/2012 | Chung | G02B 6/009 362/613 |
| 2013/0106000 A1 | 5/2013 | Chuang et al. | |

FOREIGN PATENT DOCUMENTS

| | | |
|---|---|---|
| JP | 2000-162570 A | 6/2000 |
| JP | 2005-326578 A | 11/2005 |
| JP | 2007-057688 A | 3/2007 |
| KR | 1020070049417 A | 5/2007 |
| KR | 10-0954331 B1 | 4/2010 |
| KR | 10-1023285 B1 | 3/2011 |
| KR | 10-1177132 B1 | 8/2012 |

* cited by examiner

*Primary Examiner* — Nathanael R Briggs
*Assistant Examiner* — William Peterson
(74) *Attorney, Agent, or Firm* — Cantor Colburn LLP

(57) ABSTRACT

A display apparatus includes a display panel and a mold frame. The display panel includes a display area, a peripheral area surrounding the display area, an alignment mark on the peripheral area, and a cover element overlapping the alignment mark to cover the alignment mark. The mold frame has a frame shape configured to receive the display panel. The mold frame includes a panel guide protrusion protruding from an inner surface of the mold frame, and the panel guide protrusion is adjacent to the alignment mark.

20 Claims, 7 Drawing Sheets

DISPLAY APPARATUS AND METHOD OF MANUFACTURING THE SAME

This application claims priority to Korean Patent Application No. 10-2013-0136580, filed on Nov. 11, 2013, and all the benefits accruing therefrom under 35 U.S.C. §119, the disclosure of which is incorporated by reference herein in its entirety.

BACKGROUND (1) Field

Exemplary embodiments relate to a display apparatus and a method of manufacturing the same. More particularly, exemplary embodiments relate to a display apparatus and a method of manufacturing the same which decreases a defect of a product.

(2) Description of the Related Art

A liquid crystal display ("LCD") panel is one of a flat panel display, which is used broadly. Examples of the flat panel display include, but are not limited to, the LCD panel, a plasma display panel ("PDP") and an organic light emitting display panel ("OLED").

A liquid crystal display apparatus including the liquid crystal display panel applies voltages to specific molecules of liquid crystal to convert arrangements of the molecules and change optical characteristics of a liquid crystal cell of the liquid crystal display panel such as birefringence, optical activity, dichroism, light scattering, etc. to display an image.

The liquid crystal display apparatus including the liquid crystal display panel displays an image by using properties of a liquid crystal. As advantages, the liquid crystal display apparatus is relatively thin and light-weight, and has low power consumption and low driving voltage.

SUMMARY

Generally, a liquid crystal display apparatus includes a liquid crystal display panel and a backlight assembly. The liquid crystal display panel displays an image by a light transmittance of liquid crystal therein. The backlight assembly is disposed on a lower surface of the liquid crystal display panel and provides light to the liquid crystal display panel. The backlight assembly generates a non-polarized light.

The liquid crystal display panel includes a mold frame including a protrusion protruding from an inner surface of the mold frame. When a substrate of the liquid crystal display panel is disposed on the protrusion of the mold frame, the substrate and the mold frame may be misaligned. However, since the substrate includes a transparent material and the mold frame is white, a misalignment may be difficult to detect. Therefore, since misalignment may be difficult to detect, a defect of a liquid crystal display apparatus due to the misalignment may undesirably increase.

Exemplary embodiments provide a display apparatus including an alignment mark on a display panel of the display apparatus, thereby decreasing a misalignment between elements of the display apparatus.

Exemplary embodiments also provide a method of manufacturing a display apparatus.

In accordance with an exemplary embodiment, a display apparatus includes a display panel and a mold frame.

The display panel includes a display area, and a peripheral area surrounding the display area. The display panel further includes an alignment mark on the peripheral area, and a cover element on the alignment mark to cover the alignment mark. The mold frame has a frame shape and is configured to receive the display panel. The mold frame includes a panel guide protrusion which protrudes from an inner surface of the mold frame, and is adjacent to the alignment mark.

In an exemplary embodiment, colors of the alignment mark and the mold frame may be different from each other.

In an exemplary embodiment, the color of the alignment mark may be black.

In an exemplary embodiment, the alignment mark may include carbon black.

In an exemplary embodiment, the color of the mold frame may be white.

In an exemplary embodiment, the mold frame may include polycarbonate.

In an exemplary embodiment, the display panel may further include a first substrate, and a second substrate facing the first substrate, and the alignment mark may be on the first substrate.

In an exemplary embodiment, the alignment mark may have a quadrangle shape having a width of about 2 millimeters (mm) to about 4 mm and length of about 1 millimeter (mm) to about 3 mm.

In an exemplary embodiment, the panel guide protrusion may have a quadrangle shape having a width of about 4 mm to about 6 mm and a length of about 1 mm to about 3 mm.

In an exemplary embodiment, in a plan view, the display panel may further include first and second sides facing each other, and third and fourth sides facing each other and perpendicular to the first and second sides. The alignment mark may be on the first to fourth sides of the display panel.

In an exemplary embodiment, the display apparatus may further include a light source unit configured to generate a light.

In an exemplary embodiment, the light source unit may include a light source which generates the light, and a light guide plate which is configured to guide the light to the display panel.

In accordance with an exemplary embodiment, a method of manufacturing a display apparatus includes providing an alignment mark on a peripheral area of a display panel, the display panel including a display area and the peripheral area surrounding the display area, combining the display panel with a mold frame having a frame shape to receive the display panel in the mold frame, and providing a cover element on the display panel to cover the alignment mark. The mold frame includes a panel guide protrusion which protrudes from an inner surface of the mold frame and is adjacent to the alignment mark.

In an exemplary embodiment, colors of the alignment mark and the mold frame may be different from each other.

In an exemplary embodiment, the color of the alignment mark may be black.

In an exemplary embodiment, the alignment mark may include carbon black.

In an exemplary embodiment, the color of the mold frame may be white.

In an exemplary embodiment, the mold frame may include polycarbonate.

In an exemplary embodiment, the display panel may further include a first substrate, and a second substrate facing the first substrate, and the alignment mark may be on the first substrate.

In an exemplary embodiment, in a plan view, the display panel further includes first and second sides facing each other, and third and fourth sides facing each other and perpendicular to the first and second sides. The alignment mark may be on the first to fourth sides of the display panel.

In accordance with one or more exemplary embodiment, in a display apparatus, when a display panel is combined with a mold frame, a misalignment of the display panel with respect to the mold frame may be easily detected by an alignment mark of the display panel disposed on a transparent substrate of the display panel. Therefore, a defect of the display apparatus due to such misalignment may decrease.

BRIEF DESCRIPTION OF THE DRAWINGS

The above and other features of this disclosure will become more apparent by describing in detail exemplary embodiments thereof with reference to the accompanying drawings, in which.

DETAILED DESCRIPTION

Figure 1:
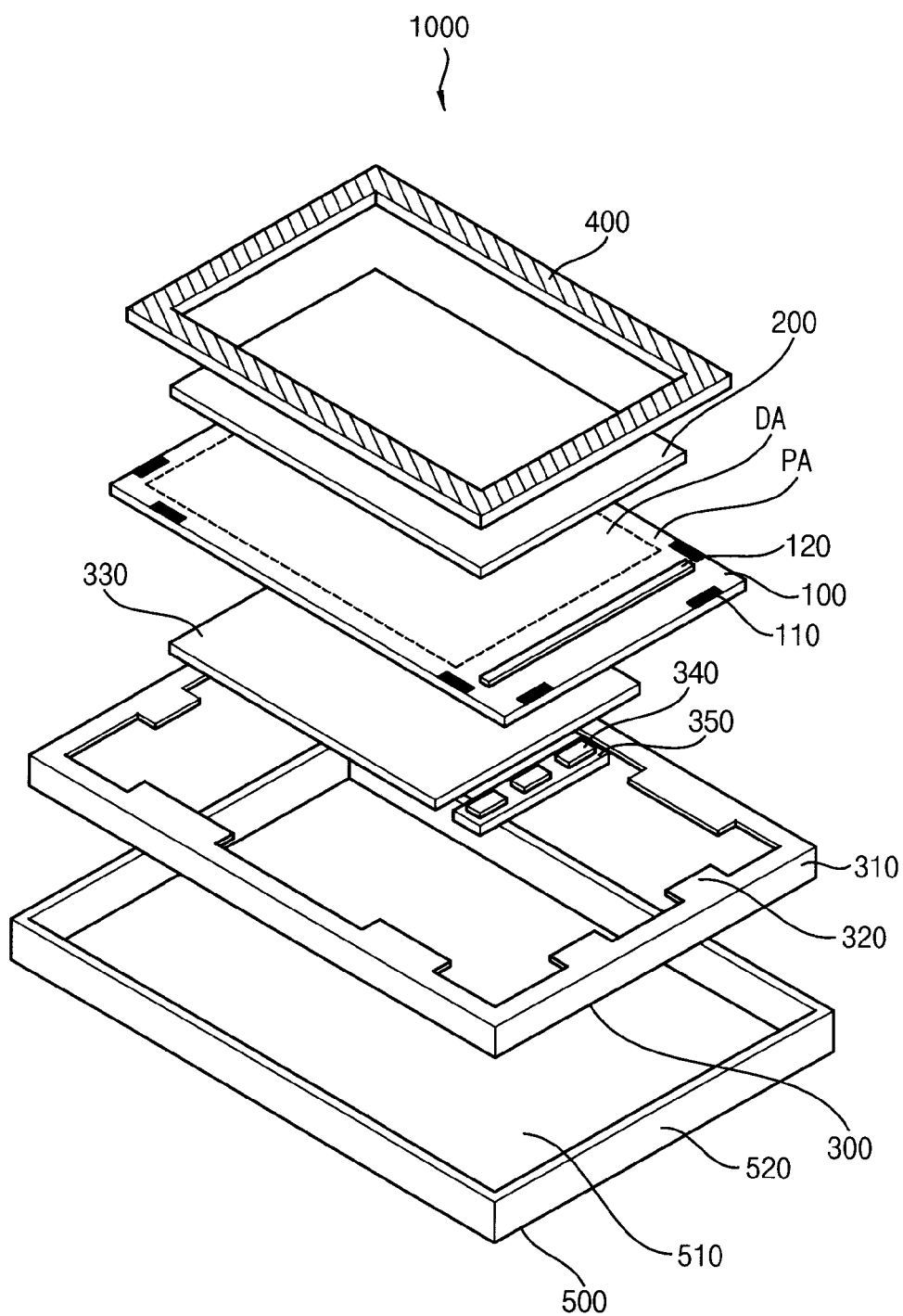
FIG. 1 is an exploded perspective view illustrating an exemplary embodiment of a display apparatus in accordance with the invention.

In the drawings, the size and relative sizes of layers and regions may be exaggerated for clarity. It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

FIG. 1 is an exploded perspective view illustrating an exemplary embodiment of a display apparatus in accordance with the invention.

Referring to FIG. 1, a display apparatus 1000 includes a display panel and a backlight assembly.

The display panel is configured to display an image. The backlight assembly is disposed on a lower surface of the display panel thereby providing light toward the display panel.

The display panel includes a first substrate 100, a second substrate 200, a liquid crystal layer (not shown), a driving chip 120 and a cover element 400.

A base substrate of the first substrate 100, for example, may be a plastic substrate. The base substrate of the first substrate 100 may include Kapton® (DuPont™), polyethersulphone, polycarbonate, polyimide, polyethyleneterephthalate, polyethylenenaphthalate, polyacrylate, fiber reinforced plastic or the like. Alternatively, the base substrate of the first substrate 100, for example, may be a glass substrate. The base substrate of the first substrate 100 may be a transparent substrate.

The first substrate 100 may include a plurality of pixel electrodes disposed in a matrix shape on the base substrate, and pixel transistors on the base substrate applying a driving voltage to the pixel electrodes.

The pixel electrodes include a transparent conductive oxide. In an exemplary embodiment, for example, the pixel electrodes may include indium tin oxide, indium zinc oxide or the like.

The pixel transistors include gate electrodes connected to gate lines, source electrodes connected to data lines, drain electrodes spaced from the source electrodes, and semiconductor patterns.

The semiconductor patterns overlap the gate electrodes and are disposed on the gate electrodes. The semiconductor pattern includes oxide. In an exemplary embodiment of manufacturing a display apparatus, a transistor may be formed by an oxide semiconductor and at a relatively low temperature, so that the transistor may be manufactured on a plastic substrate. In an exemplary embodiment, for example, the semiconductor pattern may include indium oxide, zinc oxide, tin oxide, gallium oxide or the like. Furthermore, the semiconductor pattern may include a multi metal system oxide, such as indium-zinc oxide, indium-zinc-tin oxide, or the like. The source electrode and the drain electrode may be disposed on the semiconductor pattern.

The drain electrode of the pixel transistor contacts the pixel electrode, so that the pixel transistor may be electrically connected to the pixel electrode.

The first substrate 100 includes a display area DA at which the image is displayed, and a peripheral area PA in which the image is not displayed. As illustrated in FIG. 1, the peripheral area PA surrounds the display area DA.

The first substrate 100 may include a plurality of alignment marks 110. The alignment marks 110 may be formed on the peripheral area PA and/or on the base substrate of the first substrate 100.

The first substrate 100 will be described in detail referring to FIGS. 2 to 5.

The second substrate 200 may face to the first substrate 100. A base substrate of the second substrate 200, for example, may be a plastic substrate. The base substrate of the second substrate 200 may include Kapton® (DuPont™), polyethersulphone, polycarbonate, polyimide, polyethyleneterephthalate, polyethylenenaphthalate, polyacrylate, fiber reinforced plastic or the like. Alternatively, the base substrate of the second substrate 200, for example, may be a glass substrate.

The second substrate 200 may include color filters on the base substrate and disposed to face to the pixel electrode of the first substrate 100, and a common electrode including a transparent conductive material. The color filters may include a red color filter, a green color filter and a blue color filter, but the invention is not limited thereto.

The liquid crystal layer may be disposed between the first substrate 100 and the second substrate 200, and include liquid crystal molecules. The liquid crystal layer may convert arrangements of the liquid crystal molecules by an electric field formed between the pixel electrode and the common electrode, thereby controlling a light transmittance of the display panel.

The liquid crystal layer may control a transmittance of light emitted from the backlight assembly. Thus, the light may pass through the color filter of the display panel thereby displaying an image.

The driving chip 120 may be disposed on the first substrate 100. The driving chip 120 may be electrically connected to signal lines of the first substrate 100, and the driving chip 120 may control the pixel transistors to display image.

A flexible printed circuit board (not shown) may overlap a portion of the first substrate 100, and the flexible printed circuit board may be electrically connected to the first substrate 100. The flexible printed circuit board generates a control signal, and controls the driving chip 120 by the control signal. The display panel may further include a printed circuit board electrically connected to the flexible printed circuit board.

The backlight assembly of the display apparatus 1000 may include a mold frame 300. The mold frame 300 has a frame shape and is configured to receive the display panel. The mold frame 300 includes a panel guide protrusion 320 protruding from an inner surface of the mold frame 300 and toward an open area defined in the mold frame 300. The panel guide protrusion 320 is disposed adjacent to the alignment mark 110 of the first substrate 100 of the display panel.

More specifically, the mold frame 300 may include a mold frame main body 310, and the panel guide protrusion 320 protruding from the inner surface of the mold frame main body 310. As illustrated in FIG. 1, a plurality of panel guide protrusions 320 may protrude from the inner surface of the main body 310. The main body 310 and the panel guide protrusion 320 may form a single, unitary, indivisible mold frame 300, but the invention is not limited thereto. When the display panel and the mold frame 300 of the backlight assembly are combined, the panel guide protrusion 320 guides a position of the display panel with respect to a location within the display apparatus 1000 or with respect to other elements of the display apparatus 1000.

The mold frame 300 may have a white color. In an exemplary embodiment, for example, the mold frame 300 may include polycarbonate. Generally, the polycarbonate has a white color. When the mold frame 300 has another color different from white, a manufacture cost may increase.

The backlight assembly may further include a light source unit, which emits a light. The light source unit may include a light guide plate 330, a light source 340, and a light source driving board 350 disposed the light source 340.

The light guide plate 330 may guide the light emitted by the light source 340 to the display panel. The light source 340 may generate and emit the light.

The light guide plate 330 may have a plate shape.

The light source 340 may be a light emitting diode ("LED") configured to generate a point-shaped light. The light source driving board 350 may provide a power to the LED to emit the point-shaped light. A plurality of LEDs may be disposed on the light source driving board 350. The plurality of LEDs may include a red light emitting diode, a green light emitting diode and a blue light emitting diode, but the invention is not limited thereto. Alternatively, the LEDs may include a white LED.

The display panel may include the cover element 400 disposed on the alignment mark 110 and configured to cover the alignment mark 110.

The cover element 400 may be disposed on the first substrate 100, the second substrate 200 and the mold frame 300. The cover element 400 may be disposed on the peripheral area PA of the display panel. The cover element 400 may overlap the alignment mark 110 on the peripheral area PA of the display panel. Thus, the cover element 400 may block the alignment mark 110 disposed on a transparent base substrate of the display panel, so that the alignment mark 110 may be not detected, such as from a front (e.g., display) side of the display apparatus 1000 in a top plan view thereof.

In an exemplary embodiment, for example, the cover element 400 may be a light blocking element such as a tape. The tape may have a black color. Thus, the cover element 400 having the black color may overlap the alignment mark 110, so that the alignment mark 110 may be not detected from the viewing side of the display apparatus 1000.

The display apparatus 1000 may further include a bottom chassis 500 configured to receive elements of the backlight assembly such as the mold frame 300, and/or elements of the display panel. The bottom chassis 500 may be disposed on a lower surface of the mold frame 300. The bottom chassis 500 may receive the mold frame 300, and be combined with the mold frame 300.

More specifically, the bottom chassis 500 may include a ground chassis 510 (e.g., bottom chassis) facing to a lower surface of the mold frame main body 310, and a side wall chassis 520 extending from an edge of the ground chassis 510 and along a side wall of the mold frame main body 310.

The light guide plate 330 may be received in the mold frame 300 and thereby in the bottom chassis 500. Furthermore, a position of the light guide plate 330 may be guided within the mold frame main body 310 thereby reducing or effectively preventing movement in a horizontal direction, which is parallel to a plane of the ground chassis 510.

The light source unit may be received in the mold frame 300 and thereby in the bottom chassis 500. Furthermore, the light source 340 may face to a side surface of the light guide plate 330 which connects a bottom surface thereof with a light exiting surface thereof. The light source 340 generates a light, and the light is incident to the side surface of the light guide plate 330. The light incident from the light source 340 may be guided in the light guide plate 330 and thereby emitted to the display panel.

The light source unit may further include a reflective sheet (not shown) disposed on a lower surface of the light guide plate 330.

The reflective sheet may reflect a light emitting from a lower surface of the light guide plate 330, so that the light is reflected back to the light guide plate 330. Alternatively, the ground chassis 510 of the bottom chassis 500 may function as the reflective sheet and the reflective sheet of the light source unit may be omitted. When the ground chassis 510 is coated with a reflective material, the ground chassis 510 may reflect a light leaked from the lower surface of the light guide plate 330.

The backlight assembly may further include an optical sheet (not shown).

The optical sheet may be disposed on an upper surface of the light guide plate 330. The optical sheet may be received in the mold frame 300 and thereby the bottom chassis 500. Furthermore, a position of the optical sheet may be guided in the mold frame main body 310.

The optical sheet may enhance a characteristic of the light emitted from the upper (light exiting) surface of the light guide plate 330. A plurality of the optical sheet may be disposed on an upper surface of the light guide plate 330.

The plurality of optical sheets may include a diffuser sheet, a first prism sheet and/or a second prism sheet. The diffuser sheet may diffuse the light thereby improving a brightness uniformity thereof. The first prism sheet and the second prism sheet may improve front brightness of the display apparatus 1000.

Figure 2:
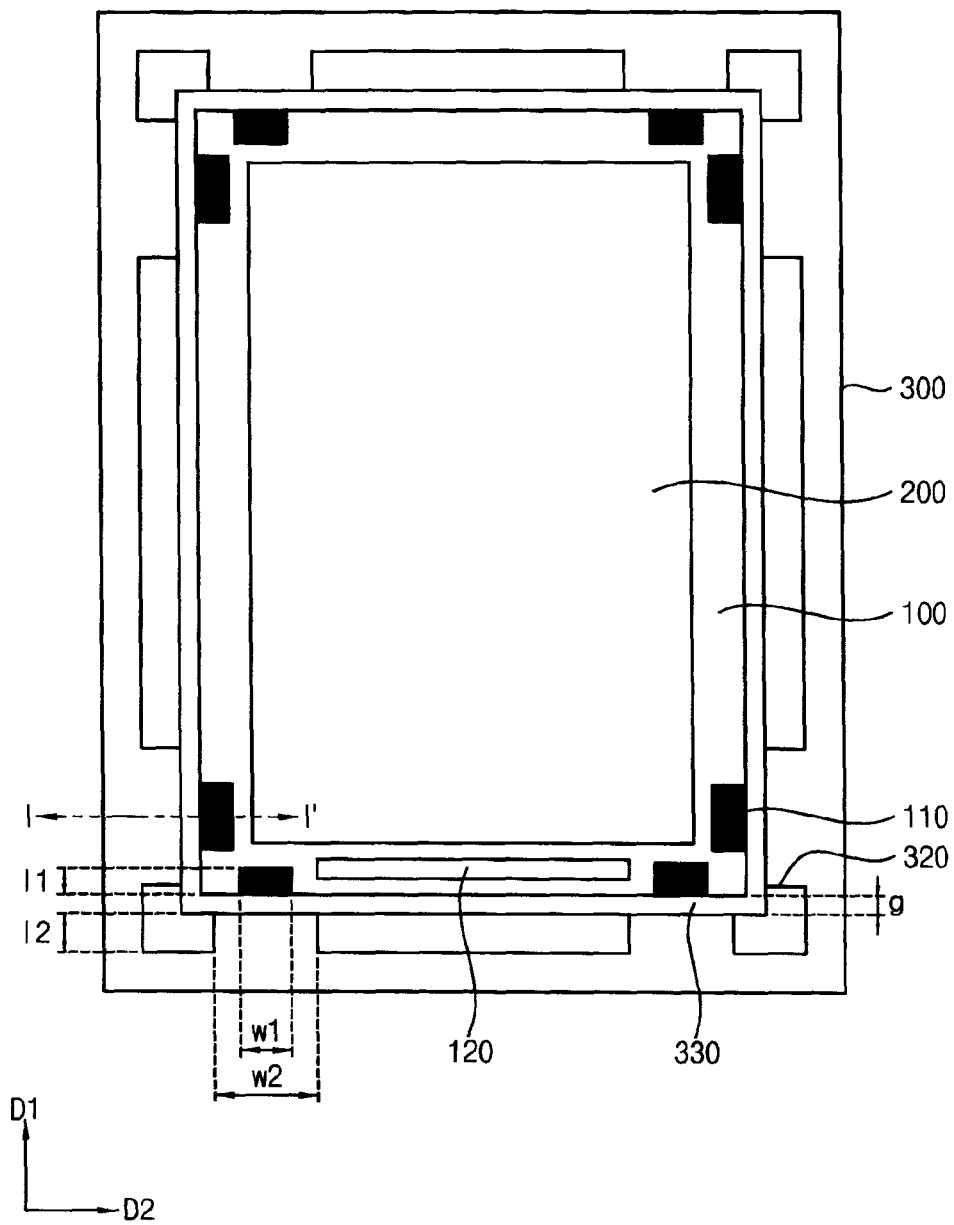
FIG. 2 is an exemplary embodiment of a plan view of the display apparatus in accordance with the invention.
Figure 3:
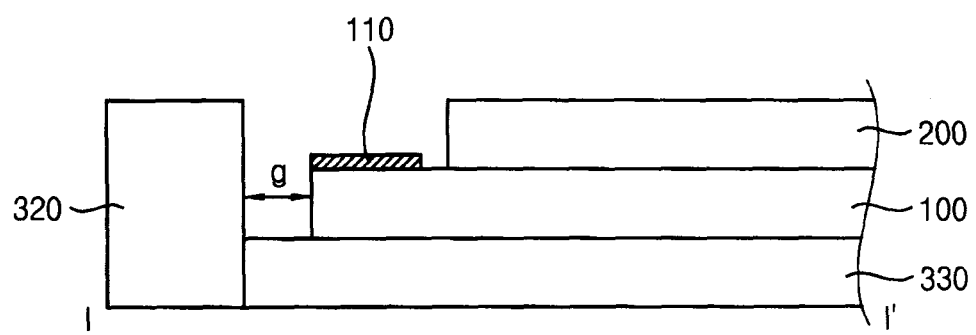
FIG. 3 is a cross-sectional view taken along line I-I' in FIG. 2.
Figure 4:
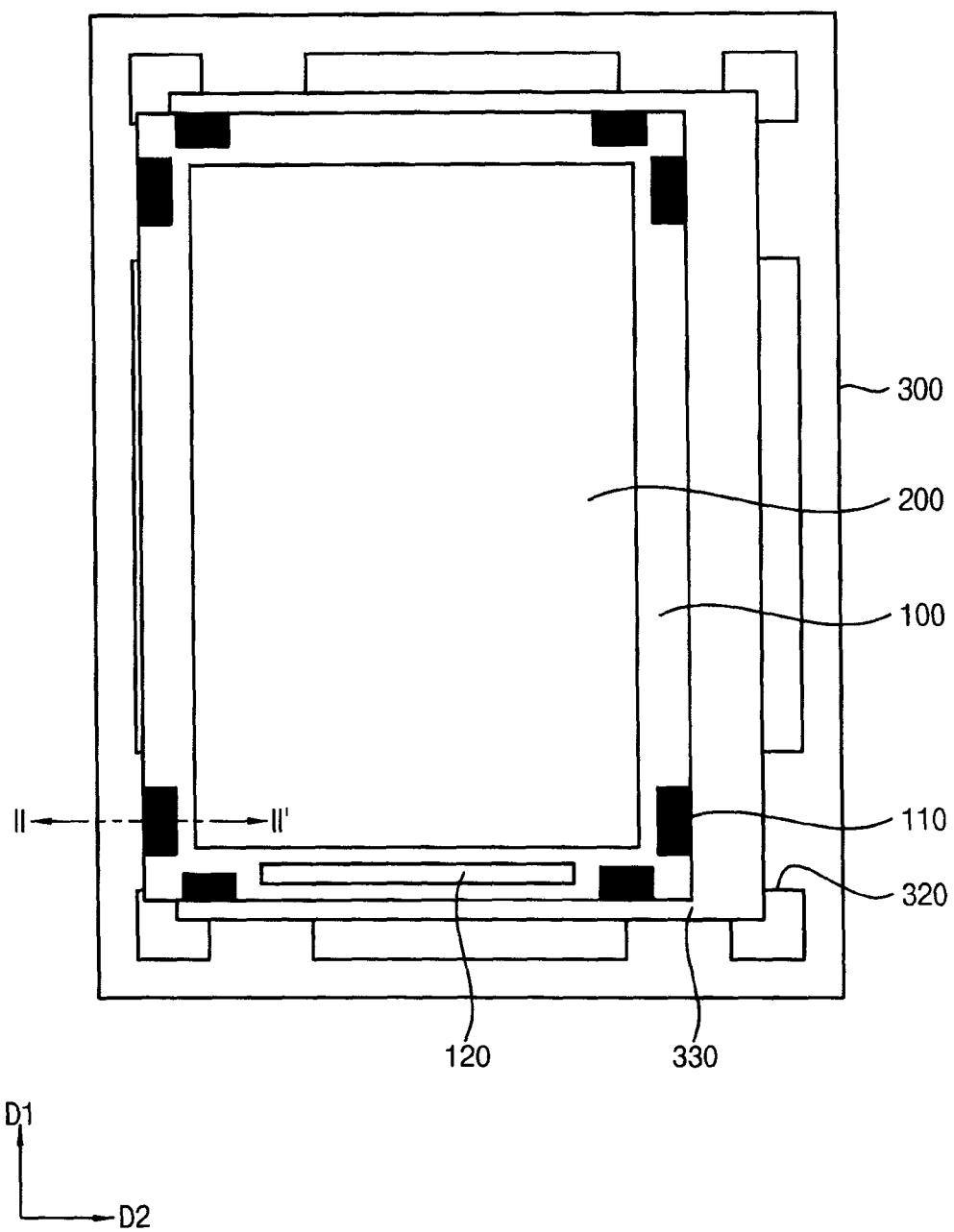
FIG. 4 is another exemplary embodiment of a plan view of the display apparatus in accordance with the invention.
Figure 5:
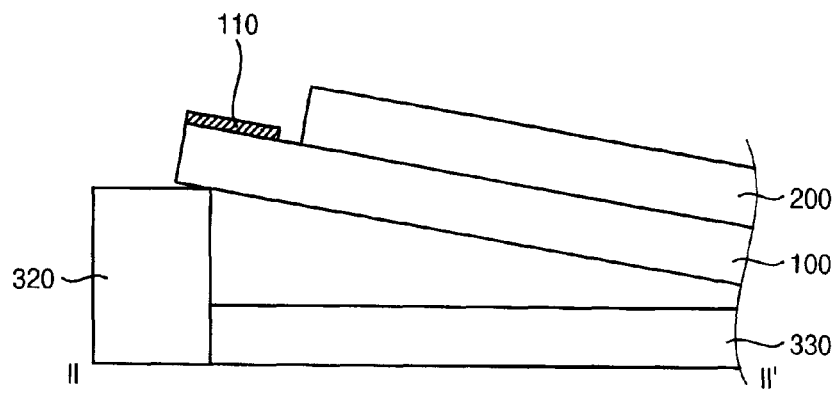
FIG. 5 is a cross-sectional view taken along line II-II' in FIG. 4.

FIG. 2 is an exemplary embodiment of a plan view of the display apparatus in accordance with the invention. FIG. 3 is a cross-sectional view taken along line I-I' in FIG. 2. FIG. 4 is another exemplary embodiment of a plan view of the display apparatus in accordance with the invention. FIG. 5 is a cross-sectional view taken along line II-II' in FIG. 4.

Referring to FIGS. 1 to 5, the first substrate 100 includes a display area DA and a peripheral area PA. The peripheral area PA surrounds the display area DA.

The first substrate 100 may include a plurality of alignment marks 110. The alignment marks 110 may be disposed on the peripheral area PA.

In an exemplary embodiment, a gap 'g' defined between the panel guide protrusions 320 and the first substrate 100 is about 0.2 millimeter (mm). The gap 'g' may be taken from an inner edge of a panel guide protrusion 320 to an outer edge of the first substrate 100. Thus, when the display panel and the backlight assembly are combined, the display panel may be disposed spaced apart from the panel guide protrusion 320. The light guide plate 330 may be exposed at the gap 'g' due to the display panel spaced apart from an inner edge of the mold frame 300 at the panel guide protrusion 320. An outer surface of the first substrate 100 may face an inner surface of the mold frame 300 at the panel guide protrusion 320, when the gap 'g' is defined between the panel guide protrusions 320 and the first substrate 100.

However, an edge portion of the first substrate 100 of the display panel is transparent, so that the misalignment of the display panel with respect to the backlight assembly may be difficult to detect, when the first substrate 100 is disposed spaced apart from the panel guide protrusions 320.

In an exemplary embodiment of manufacturing a display apparatus, the alignment marks 110 may be formed by printing a color ink on an element of the first substrate 100. The alignment marks 110 may be printed by a labeler including various color inks. In an exemplary embodiment for example, the color of the alignment mark 110 may be black. More specifically, the alignment marks 110 may include a black pigment, such as carbon black.

The alignment marks 110 and the mold frame 300 may have different colors from each other. Thus, the misalignment of the display panel and backlight assembly including the mold frame 300 may be easily found such as during an inspection or manufacturing process of the display apparatus 1000.

More specifically, when the alignment marks 110 are respectively disposed corresponding to the panel guide protrusions 320 having a white color, the misalignment may be found by a visual examination. Thus, the display panel and the mold frame 300 may be combined at appropriate positions thereof, to thereby reduce or effectively prevent a misalignment defect of a display apparatus.

In an exemplary embodiment of manufacturing a display apparatus, the alignment marks 110 may be printed on the peripheral area PA of the display panel by the labeler. Generally, the labeler may be a printing apparatus to print a serial number on the substrate during manufacturing the substrate, therefore, a detailed description of the labeler may be omitted.

The display panel may include two long sides facing each other, and two short sides facing each other and substantially perpendicular to the long sides. The two long sides may be referred to as first and second sides, and the two short sides may be referred to as third and fourth sides, but the invention is not limited thereto. The alignment marks 110 may be disposed on at least one of the first side of the first substrate 100 and the second side facing the first side, and the third side and the fourth side facing each other.

In an exemplary embodiment, for example, the alignment marks 110 may be disposed on each of the first side and the second side of the display panel. Alternatively, the alignment marks 110 may be disposed on each of the third side and the fourth side of the display panel. Furthermore, the alignment marks 110 may be disposed on each of the first side, the second side, the third side and the fourth side. One or more alignment mark 110 may be disposed a respective side of the display panel.

The alignment marks 110 may be formed to have various shapes. In an exemplary embodiment, for example, the alignment marks 110 may be a quadrangle shape in the top plan view. The alignment mark 110 may be a quadrangle shape having a width w1 of about 2 mm to about 4 mm and a length l1 of about 1 mm to about 3 mm in the top plan view.

In an exemplary embodiment, the panel guide protrusions 320 may be formed during manufacturing the mold frame 300, at the same time and/or including a same material, such that the panel guide protrusions 320 and a remainder of the mold frame 300 form a single, unitary, indivisible member. The panel guide protrusions 320 may be formed to have various shapes. In an exemplary embodiment, for example, the panel guide protrusions 320 may be a quadrangle shape in the top plan view. The panel guide protrusion 320 may be a quadrangle shape having a width w2 of about 4 mm to about 6 mm and a length l2 of about 1 mm to about 3 mm. The dimensions of the panel guide protrusion 320 may be taken from a virtual line extended from the inner surface of the mold frame main body 310, to a distal end of the panel guide protrusion 320.

An exemplary embodiment of manufacturing a display apparatus includes providing such as by printing, an alignment mark 110 on a peripheral area PA of a display panel, combining the display panel with the mold frame 300 including the panel guide protrusion 320 to receive the display panel in the mold frame 300; and providing a cover element 400 on the display panel to cover the alignment mark. The combining the display panel with the mold frame 300 may include aligning the alignment mark 110 with the panel guide protrusion 320.

Referring to FIG. 4 and FIG. 5, in an exemplary embodiment of manufacturing a display apparatus, alignment marks 110 at a first side of the display panel may be aligned to correspond to the panel guide protrusions 320 at a first side of the mold frame 300. A relatively large gap may be defined at the first side, while a second side of the display panel facing the first side overlaps (e.g., no gap) the panel guide protrusions 320 at a second side of the mold frame 300. Since the alignment marks 110 and the mold frame 300 may have different colors from each other, misalignment of the display panel and the mold frame 300 of the backlight assembly may be easily identified to move the display panel into a proper position with respect to the backlight assembly. A proper position may include a gap 'g' defined at each of the four sides of the display panel, but the invention is not limited thereto.

Therefore, since the first substrate 100 is disposed relative to the panel guide protrusions 320, via the alignment marks 110 of the display panel, a misalignment may be reduced or effectively prevented.

Figure 6:
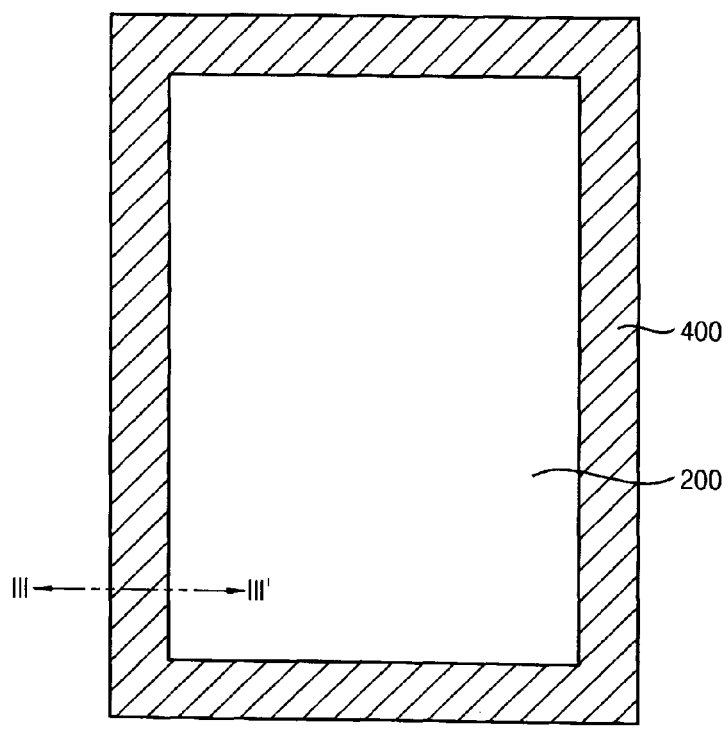
FIG. 6 is still another exemplary embodiment of a plan view of the display apparatus in accordance with the invention.
Figure 7:
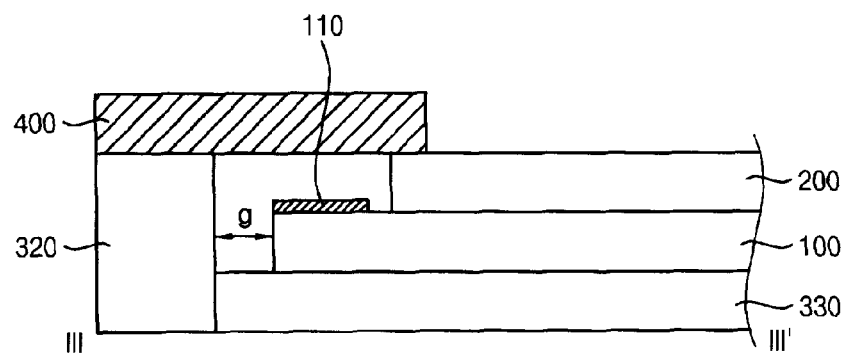
FIG. 7 is a cross-sectional view taken along line III-III' in FIG. 6.
Figure 8:
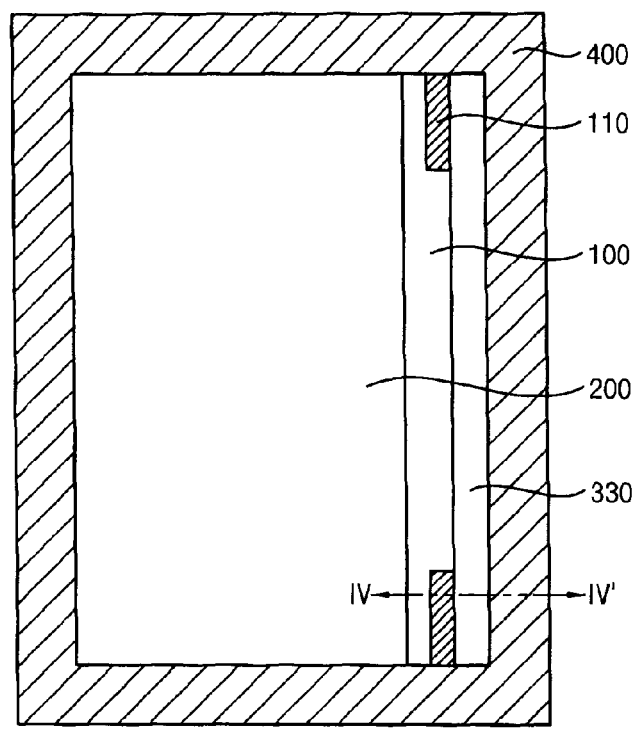
FIG. 8 is yet another exemplary embodiment of a plan view of the display apparatus in accordance with the invention.
Figure 9:
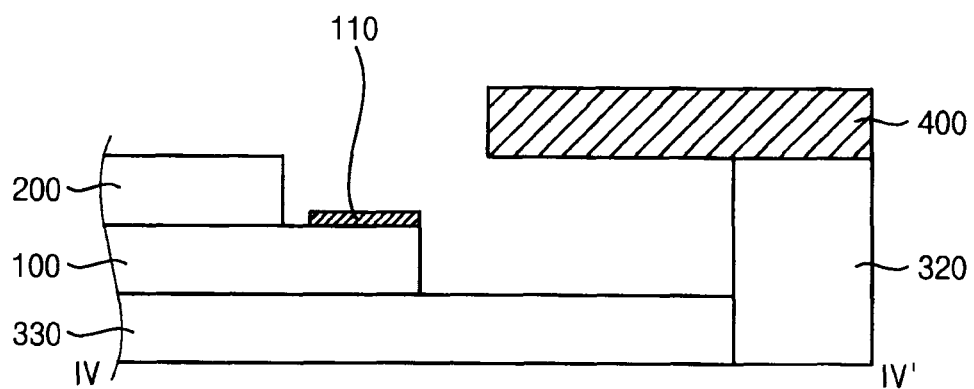
FIG. 9 is a cross-sectional view taken along line IV-IV' in FIG. 8.

FIG. 6 is still another exemplary embodiment of a plan view of the display apparatus in accordance with the invention. FIG. 7 is a cross-sectional view taken along line III-III' in FIG. 6. FIG. 8 is yet another exemplary embodiment of a plan view of the display apparatus in accordance with the invention. FIG. 9 is a cross-sectional view taken along line IV-IV in FIG. 8.

Referring to FIGS. 6 and 7, when the misalignment between the display panel and the mold frame 300 does not occur, the cover element 400 may be disposed on the first substrate 100, the second substrate 200 and the mold frame 300 to cover (e.g., overlap in the top plan view) the alignment marks 110.

When the misalignment of the display panel and the mold frame does not occur, the cover element 400 may be disposed on the peripheral area PA of the display panel. More specifically, the cover element 400 may overlap the alignment marks 110 on the peripheral area PA. Thus, the alignment mark 110 may not be detected from a front side of the display apparatus 1000.

In an exemplary embodiment, for example, the cover element 400 may be a view-blocking element such as a tape. The tape may have a black color. Thus, the cover element 400 having the black color may overlap the alignment mark 110, so that the alignment mark 110 may be not detected in a top plan view of the display apparatus 1000.

The light guide plate 330 may be disposed inside of the mold frame 300 including the panel guide protrusion 320. The first substrate 100 including the alignment mark 110 may be disposed on the light guide plate 330. The second substrate 200 may be disposed on the first substrate 100 and may expose a portion of the first substrate 100 such as exposing a portion of the peripheral area PA of the display panel. The cover element 400 may be disposed on the panel guide protrusion 320 and the second substrate 200. Thus, the cover element 400 may be disposed on the alignment marks 110 to cover the alignment marks 110, such that the alignment marks 110 are not exposed in the top plan view of the display apparatus 1000.

Referring to FIGS. 8 and 9, when the misalignment of the display panel and the mold frame occurs, the cover element 400 may be disposed on (e.g., above) the first substrate 100, the second substrate 200 and the mold frame 300. However, the cover element 400 may not cover a portion of the alignment marks 110, and the alignment marks 110 may be viewable from the front surface of the display apparatus 1000.

The light guide plate 330 may be disposed in the mold frame 300 including the panel guide protrusion 320. The first substrate 100 including the alignment mark 110 may be disposed on the light guide plate 330. The second substrate 200 may be disposed on the first substrate 100 and may expose a portion of the first substrate 100 such as exposing a portion of the peripheral area PA of the display panel. The cover element 400 may be disposed on the panel guide protrusion 320. However, the cover element 400 may be not disposed on the alignment marks 110. Thus, the cover element 400 may not cover the alignment marks 110, such that the alignment marks 110 are undesirably exposed in the top plan view of the display apparatus 1000.

One or more exemplary embodiment of the invention provides a display apparatus and a method of manufacturing thereof, in which during combining of the display panel and the backlight assembly, a misalignment between the display panel and the backlight assembly may be reduced or effectively prevented via an alignment mark disposed on a transparent base substrate of the display panel. Therefore, a defect of a display apparatus caused by misalignment may decrease.

One or more exemplary embodiment of a display apparatus and a method of manufacturing a display apparatus according to the invention may be applied to various types of display apparatuses such as a liquid crystal display apparatus, an organic light emitting diode apparatus, or the like.

Although exemplary embodiments have been described, it is understood that the invention should not be limited to these exemplary embodiments and various changes and modifications can be made by one of those ordinary skilled in the art within the spirit and scope of the invention as hereinafter claimed.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus, comprising:
   a display panel comprising:
      a display area, and a peripheral area surrounding the display area,
      an alignment mark on the peripheral area; and
      a cover element overlapping the alignment mark to cover the alignment mark; and
   a mold frame having a frame shape and configured to receive the display panel,
      the mold frame comprising a panel guide protrusion which protrudes from an inner surface of the mold frame and is adjacent to the alignment mark.

2. The display apparatus of claim 1, wherein colors of the alignment mark and the mold frame are different from each other.

3. The display apparatus of claim 2, wherein the color of the alignment mark is black.

4. The display apparatus of claim 3, wherein the alignment mark comprises carbon black.

5. The display apparatus of claim 2, wherein the color of the mold frame is white.

6. The display apparatus of claim 5, wherein the mold frame comprises polycarbonate.

7. The display apparatus of claim 1, wherein
   the display panel further comprises a first substrate, and a second substrate facing the first substrate, and
   the alignment mark is on the first substrate.

8. The display apparatus of claim 1, wherein the alignment mark has a quadrangle shape having a width of about 2 millimeters to about 4 millimeters, and a length of about 1 millimeter to about 3 millimeters.

9. The display apparatus of claim 1, wherein the panel guide protrusion has a quadrangle shape having a width of about 4 millimeters to about 6 millimeters and a length of about 1 millimeter to about 3 millimeters.

10. The display apparatus of claim 1, wherein
    in a plan view, the display panel further comprises first and second sides facing each other, and third and fourth sides facing each other and perpendicular to the first and second sides, and
    the alignment mark is on the first to fourth sides of the display panel.

11. The display apparatus of claim 1, further comprising a light source unit configured to generate light.

12. The display apparatus of claim 11, wherein the light source unit comprises:
    a light source generating the light, and
    a light guide plate configured to guide the light to the display panel.

13. A method of manufacturing a display apparatus, comprising:
    providing an alignment mark on a peripheral area of a display panel, the display panel comprising a display area, and the peripheral area surrounding the display area;
    combining the display panel with a mold frame having a frame shape, to receive the display panel in the mold frame; and
    providing a cover element on the display panel to cover the alignment mark,
    wherein the mold frame comprises a panel guide protrusion which protrudes from an inner surface of the mold frame and is adjacent to the alignment mark.

14. The method of claim 13, wherein colors of the alignment mark and the mold frame are different from each other.

15. The method of claim 14, wherein the color of the alignment mark is black.

16. The method of claim 14, wherein the alignment mark comprises carbon black.

17. The method of claim 14, wherein the color of the mold frame is white.

18. The method of claim 17, wherein the mold frame comprises polycarbonate.

19. The method of claim 13, wherein
    the display panel further comprises a first substrate, and a second substrate facing the first substrate, and
    the alignment mark is on the first substrate.

20. The method of claim 13, wherein
    in a plan view, the display panel further comprises first and second sides facing each other, and third and fourth sides facing each other and perpendicular to the first and second sides, and the alignment mark is on first to fourth sides of the display panel.

\* \* \* \* \*